H. MEREDITH-JONES.
AUTOMATIC CURRENT CONTROLLER.
APPLICATION FILED MAR. 26, 1913.
1,096,934.
Patented May 19, 1914.
2 SHEETS—SHEET 2.
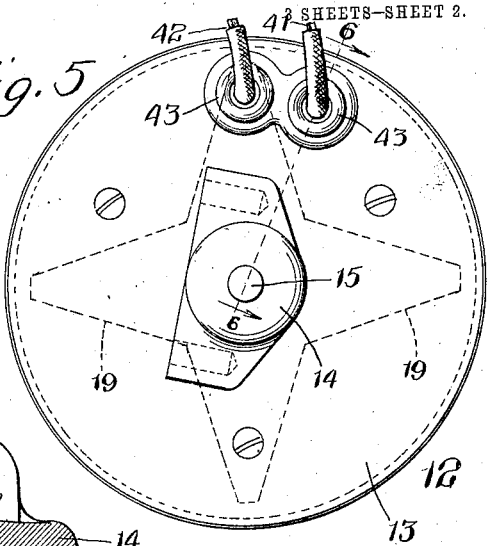
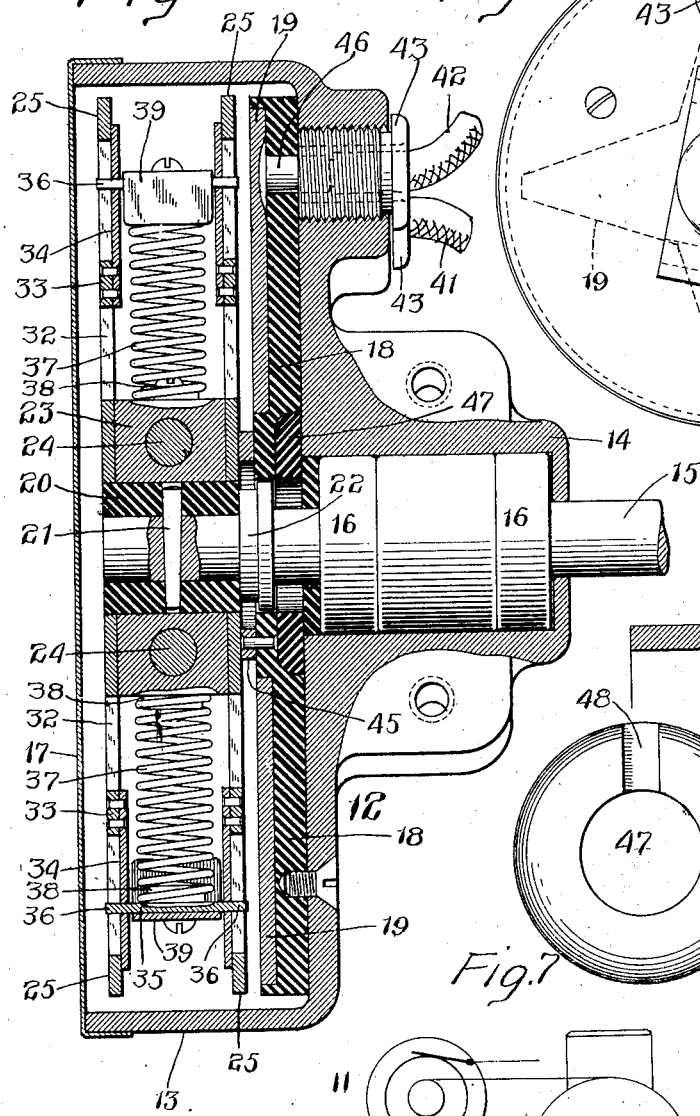
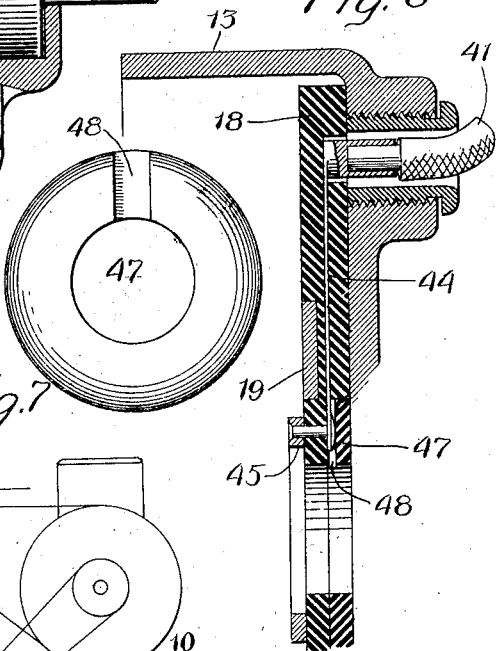
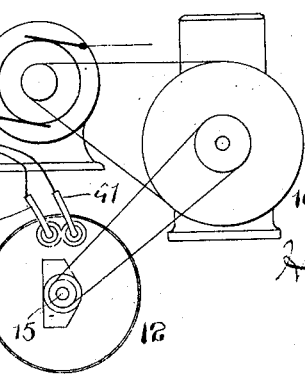
WITNESSES:
H. W. Meade
S. W. Atherton
INVENTOR
Hubert Meredith-Jones
BY
N. M. Wooster
ATTORNEY H. MEREDITH-JONES.
AUTOMATIC CURRENT CONTROLLER.
APPLICATION FILED MAR. 26, 1913.
1,096,934.
Patented May 19, 1914.
3 SHEETS—SHEET 3.
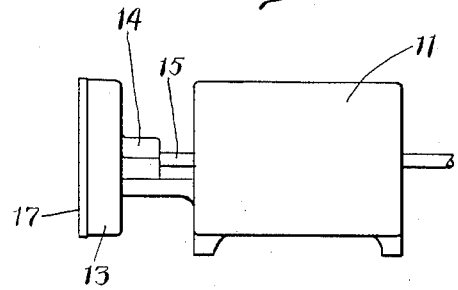
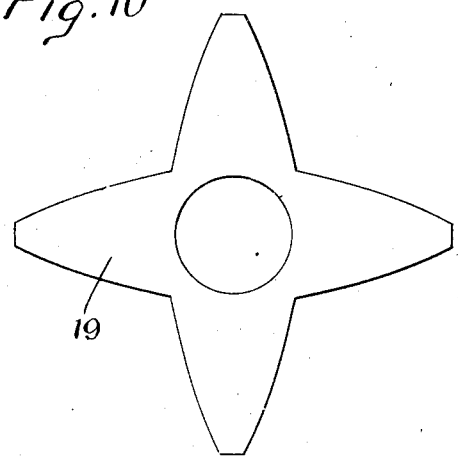
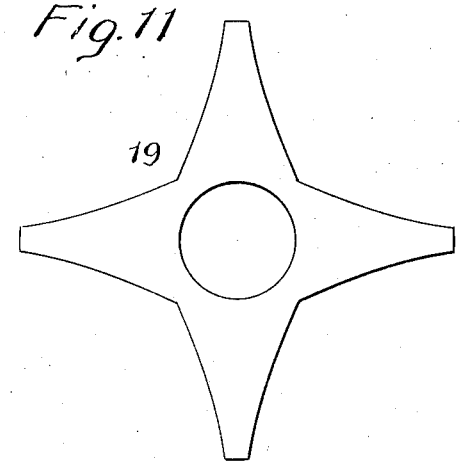
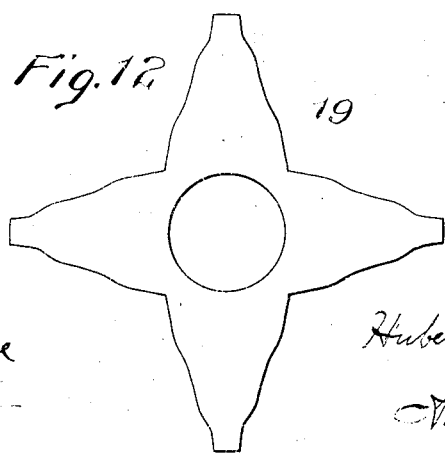
WITNESSES:
INVENTOR
Hubert Meredith-Jones
BY
ATTORNEY

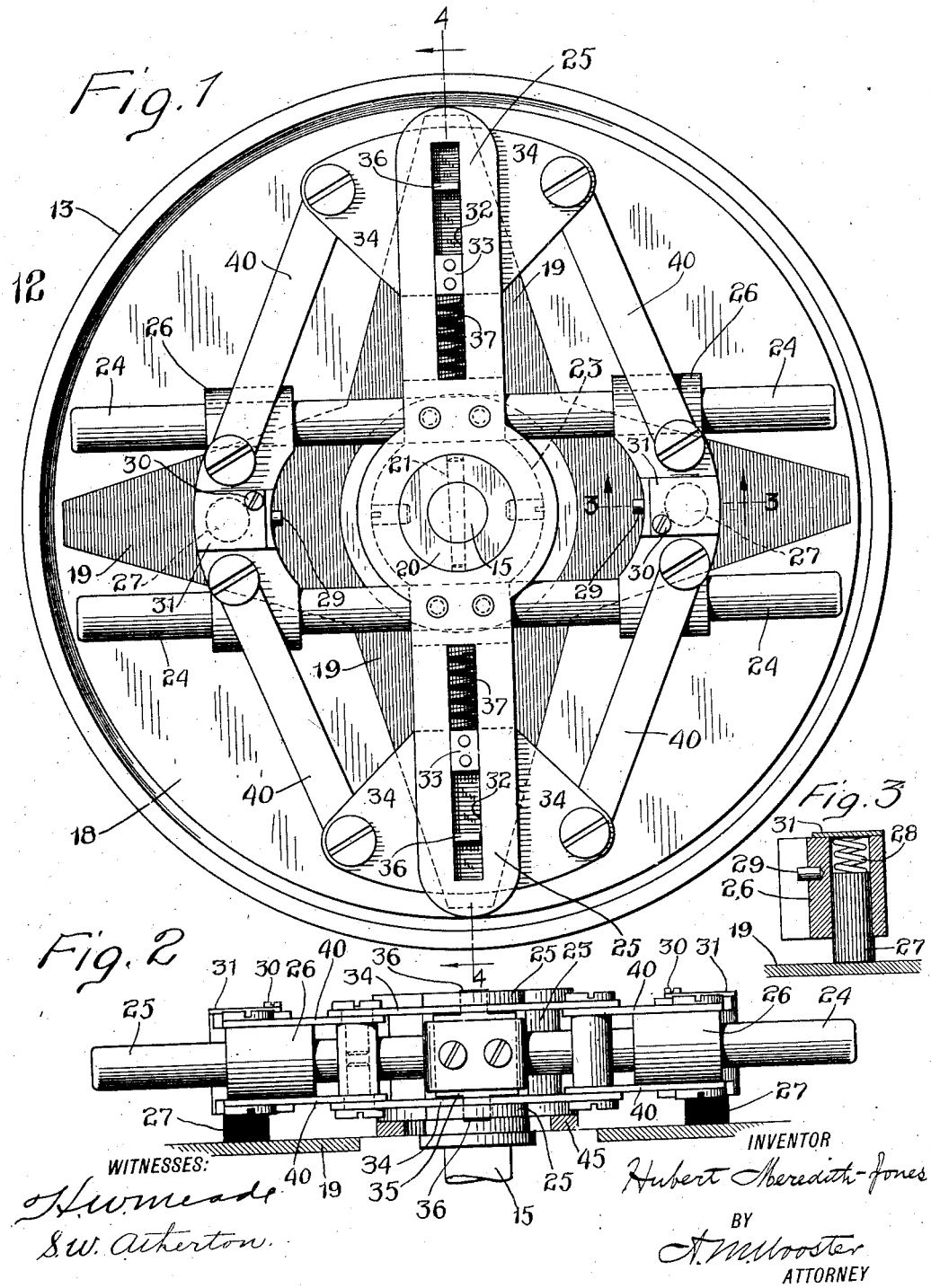

UNITED STATES PATENT OFFICE.

HUBERT MEREDITH-JONES, OF NEW YORK, N. Y.

AUTOMATIC CURRENT-CONTROLLER.

1,096,934.   Specification of Letters Patent.   Patented May 19, 1914.

Application filed March 26, 1913. Serial No. 756,906.

*To all whom it may concern:*

Be it known that I, HUBERT MEREDITH-JONES, a subject of the King of Great Britain, residing at New York city, county of New York, State of New York, have invented an Improvement in Automatic Current-Controllers, of which the following is a specification.

This invention has for its object to produce an automatic current controller adapted to be interposed between a generator and work to be performed thereby, both the controller and the generator being operated by the same prime mover, as for example a hydrocarbon engine. The function of the controller is to insure a uniform current to the work without regard to the speed of the generator, as for example, if the prime mover in addition to running the generator furnished motive power in a shop or drove a motor car, which would necessarily cause great fluctuation in the speed of the generator.

Briefly, then, the purpose of this invention is to insure a practically uniform current for the secondary work to be performed by the prime mover without regard to fluctuations in the amount of primary work performed thereby, the effect of which would be to vary the speed of the generator, as, in changes of the amount of power used in a shop or the driving and stopping of a motor car.

In the accompanying drawings forming a part of this specification, Figure 1 is an elevation of the controller, the cover being removed and the parts in operating position; Fig. 2 an edge view of the operative parts as seen from the bottom of Fig. 1; Fig. 3 a detail sectional view on the line 3—3 in Fig. 1, looking in the direction of the arrows; Fig. 4 a section on the line 4—4 in Fig. 1, looking in the direction of the arrows, parts being in elevation; Fig. 5 an elevation on a reduced scale as seen from the right in Fig. 4; Fig. 6 a section on an enlarged scale on the line 6—6 in Fig. 5, looking in the direction of the arrows; Fig. 7 a view of the insulating filling washer detached; Fig. 8 a diagrammatic view showing an arrangement in which a prime mover, a generator and my novel controller are connected up; Fig. 9 a diagrammatic view showing an arrangement in which the generator shaft is extended and also serves as a controller shaft, and Figs. 10, 11 and 12 are views showing contact pieces having variant forms of tapering arms.

10 denotes a prime mover, 11 a generator and 12 my novel controller. The controller comprises a casing 13 having a hub 14 adapted for attachment in any suitable position and a cover 17.

15 denotes a shaft journaled in the hub and preferably provided with ball bearings indicated as a whole by 16.

Within the casing and rigidly secured to the back thereof is an insulating plate 18.

19 denotes a contact piece which is set into the insulating plate flush with the surface thereof. The contact piece is shown as provided with four tapering arms, but more or less arms may be used as preferred. The arms in Fig. 1 are shown as provided with straight tapering sides, although the sides of the tapering arms may if preferred be concave or convex curves or may be undulating (see Figs. 10, 11 and 12) without departing from the principle of the invention. The shaft passes well into the casing and is provided at its end with an insulating sleeve 20 which is rigidly secured thereto as by a pin 21 and lies against a collar 22 on the shaft.

23 denotes a hub which is rigidly secured to the insulating sleeve, as by screws, (see dotted lines in Fig. 1) and which carries the controlling mechanism.

24 denotes parallel guide rods rigidly secured in the hub and 25 side plates which are also rigidly secured to the hub and are provided with central holes which receive the opposite ends of the insulating sleeve.

26 denotes relatively heavy slides adapted to travel backward and forward upon the guide rods. Each of these slides carries a carbon brush 27 which is adapted to contact with the tapering arms of the contact piece and with the surface of the insulating plate between the tapering arms and also with the contact piece below the bases of the arms. The brushes are socketed in the slides and are forced forward into close contact with the arms of the contact piece and the insulating plate by springs 28 (see Fig. 3).

29 denotes stop pins which limit the inward movement of the slides by engagement with hub 23. The brushes may be renewed by loosening screws 30 which hold cover plates 31, turning the plates aside, removing the springs and brushes, then putting in new brushes, replacing the springs and turning the cover plates to place and securing them by means of the screws. Side plates 25 are provided with slots 32 in which blocks 33 slide. These blocks are rigidly secured to relatively light plates 34 which lie within the side plates.

35 denotes cross plates which extend between plates 34 and are provided with lugs 36 which pass through said plates and are adapted to slide in slots 32.

37 denotes springs lying between side plates 25 and bearing against hub 23 and cross plates 35. The inner ends of these springs are retained in place by hubs 38 which are secured to hub 23 and the outer ends of the springs are secured in place by similar hubs 38 secured to the cross plates, the springs being additionally supported by U-shaped cap plates 39 which are also secured to the cross plates. Slides 26 and plates 34 are connected by means of links 40.

The course of the current is as follows: 41 and 42 denote the wires. For convenience in description, I will term wire 41 the incoming wire and wire 42 the outgoing wire. The incoming wire connects the controller with the generator and passes through an insulating bushing 43 and is connected to a contact strip 44 which is set into insulating plate 18 and is connected to a contact ring 45 which is rigidly secured to the insulating plate and lies between said plate and the central portion of the inner side plate 25. From this ring the current passes to the side plates and hub 23, all of the rotating parts being charged, thence to the carbon brushes and to the tapering arms of contact piece 19 (see Figs. 1 and 4). From contact piece 19 the current passes through a connection 46 to outgoing wire 42 which passes through an insulating bushing 43. It will be noted that both the shaft and the casing are effectually insulated from all current carrying parts. For the furtherance of this purpose and for convenience in assembling, insulating plate 18 is provided in its back with a circular recess which is filled in by an insulating washer 47 having a groove 48 to receive contact strip 44.

In the arrangement indicated in Fig. 8, it will be noted that the generator and the controller are independently driven by the prime mover, while in the form illustrated in Fig. 9, the generator and the controller are on the same shaft, which is driven by any suitable prime mover (not shown). In the inoperative position of the parts (not shown in the drawing) the carbon brushes will lie in contact with the central portion of the contact piece, that is, below the bases of the arms. When the prime mover is started the shaft of the controller is driven thereby, either directly or indirectly, and centrifugal force will act to throw the slides, which are relatively heavy, outward on the guide rods, the effect of which is to draw plates 34, which are relatively light, inward against the power of springs 37. The farther out on the arms the brushes are thrown the shorter will be their periods of contact with the contact piece and the greater the intervals between the contacts owing to the taper of the arms. The power of the springs is sufficient so that while the speed of the controller remains relatively low the brushes will remain in engagement with the contact piece below the bases of the arms and there will be no interruption of the contact. As the speed increases and the slides carrying the brushes move outward by centrifugal force, there will first be relatively short intervals between the contacts, the intervals growing longer and the contacts shorter as the speed increases and the slides move outward on the guide rods and the brushes contact with the narrowing outer ends of the tapering arms. Supposing that the position of the parts shown in Fig. 1 is an ordinary working position, the slides will move inward and outward from this position. Should the speed of the generator increase the slides will move outward, the effect of which will be to produce shorter contact of the brushes with the contact piece and longer intervals between the contacts, which will necessarily decrease the amount of current that can pass through the controller to the secondary work, ordinarily to a storage battery interposed between the work and the controller. No storage battery is shown, however, as it forms no portion of the present invention. Should the speed of the generator diminish, the effect will be the reverse of what has just been described and the slides will move inward on the guide rods, the effect of which will be to increase the duration of the contacts between the brushes and the contact piece and to shorten the intervals between the contacts, and consequently to increase the amount of current that can pass through the controller to the work. The parts are so proportioned and the power of the springs so graduated as to make the operation of the controller automatic and thereby insure the passing of a practically uniform supply of current to the secondary work.

Having thus described my invention I claim:

1. A controller of the character described comprising a driven shaft, insulated controlling mechanism carried thereby, including diametrically arranged contact brushes, a contact piece having tapering arms adapted to be engaged by the brushes and electrical connections with the contact piece and the brushes.

2. A controller of the character described comprising an insulating plate, a contact piece having tapering arms set into said plate, a driven shaft, centrifugally acting controlling mechanism carried by said shaft and insulated therefrom, brushes carried by said controlling mechanism on opposite sides of the driven shaft and adapted to engage the insulating plate and the contact piece and electrical connections with the contact piece and the brushes, the controlling mechanism acting as the speed increases to move the brushes outward so that the contacts of the brushes with the contact piece will be shortened and the intervals between the contacts lengthened, thereby automatically regulating the amount of current that can pass through the controller.

3. Controlling mechanism of the character described comprising a driven shaft, a hub on said shaft insulated therefrom, parallel guide rods secured to the hub, relatively heavy slides on said rods, brushes carried by said slides, slotted side plates rigidly secured to the shaft on opposite sides of the hub, relatively light plates having sliding engagement with the slots, links intermediate said plates and the slides, cross plates secured to the first mentioned plates, springs intermediate the hub and the cross plates, an insulated contact piece, and electrical connections with the brushes and contact piece.

4. The combination with a driven shaft, insulated centrifugally acting controlling mechanism carried thereby and brushes carried by the controlling mechanism on opposite sides of the driven shaft, of a contact piece having tapering arms adapted to be engaged by the brushes and electrical connections with the contact piece and the brushes, the controlling mechanism acting to move the brushes outward or inward as the speed increases or diminishes and to shorten the contacts of the brushes with the tapering arms and to lengthen the intervals between the contacts or vice versa, whereby the amount of current that can pass through the controller is automatically regulated.

5. The combination with a driven shaft, insulated centrifugally acting controlling mechanism carried thereby, and spring-controlled brushes carried by the controlling mechanism on opposite sides of the driven shaft, of an insulating plate, a contact piece having tapering arms set into the insulating plate and adapted to be engaged by the brushes and electrical connections with the contact piece and brushes, substantially as described, for the purpose specified.

6. The combination with a prime mover and a generator driven thereby, of a controller comprising a shaft driven by the prime mover, a contact piece having tapering arms, insulated centrifugally acting controlling mechanism carried by the shaft, brushes carried by the controlling mechanism and adapted to contact with the arms, and electrical connections with the brushes and the contact piece, one of said connections leading to the generator, substantially as described, for the purpose specified.

7. The combination with a prime mover and a generator driven thereby, of automatic current-controlling means driven by the prime mover comprising centrifugally acting mechanism, brushes carried thereby, a contact piece having tapering arms adapted to be engaged by the brushes and electrical connections with the contact piece and the brushes, one of said connections leading to the generator.

8. The combination with a prime mover and a generator driven thereby, of automatic current-controlling means comprising a shaft driven by the prime mover, insulated centrifugally acting controlling mechanism, brushes carried thereby, an insulating plate, a contact piece having tapering arms set into the insulating plate, said plate and said contact piece being adapted to be engaged by the brushes, and electrical connections with the contact piece and the brushes, one of said connections leading to the generator.

9. The combination with a prime mover and a generator, of automatic current-controlling means comprising a shaft driven by the prime mover, a hub carried by said shaft and insulated therefrom, parallel guide rods secured to said hub, relatively heavy slides on said guide rods, brushes carried by the slides, slotted side plates also secured to the hub, relatively light plates having slotted engagement with the side plates, cross plates between the side plates, springs intermediate the hub and the cross plates, links connecting the first mentioned plates and the slides, a contact piece having tapering arms adapted to be engaged by the brushes and electrical connections with the contact piece and the brushes, one of said connections leading to the generator.

10. A controller of the character described comprising a fixed insulated contact piece having radially extending tapering arms, insulated centrifugally acting controlling mechanism, diametrically arranged brushes carried by the controlling mechanism and adapted to engage the contact piece and electrical connections with the contact piece and the brushes.

11. A controller of the character described comprising a contact piece having radially extending tapering arms, a fixed insulating plate into which the contact piece is set, insulated centrifugally acting controlling mechanism, diametrically arranged brushes carried by the controlling mechanism and adapted to engage the contact piece and its arms and to engage the insulating plate between the arms and electrical connections with the contact piece and the brushes.

12. A controller of the character described comprising a contact piece having radially extending tapering arms, a fixed insulating plate into which the contact piece is set, rotating controlling mechanism including centrifugally acting slides, diametrically arranged brushes carried by the slides and adapted to engage the contact piece and the insulating plate between the arms, and electrical connections with the contact piece and the brushes.

13. A controller of the character described comprising a contact piece having radially extending tapering arms, a fixed insulating plate into which the contact piece is set, controlling mechanism comprising relatively heavy centrifugally acting slides, brushes carried by the slides and adapted to engage the contact piece and the insulating plate between the arms, relatively light radially sliding spring-controlled plates between the slides, links connecting the plates and the slides, and electrical connections with the contact piece and the brushes.

14. A controller of the character described comprising a contact piece having radially extending tapering arms, a fixed insulating plate into which the contact piece is set, controlling mechanism comprising relatively heavy centrifugally acting slides, brushes carried by the slides and adapted to engage the contact piece and the insulating plate between the arms, relatively light radially sliding spring-controlled plates between the slides, links connecting the plates and the slides, a contact ring secured to the insulating plate and contacting with the controlling mechanism, and electrical connections with the contact ring and the brushes.

15. A controller of the character described comprising a contact piece having radially extending tapering arms, a fixed insulating plate into which the contact piece is set, controllable mechanism comprising relatively heavy centrifugally acting slides, brushes carried by the slides and adapted to engage the contact piece and the insulating plate between the arms, relatively light spring-controlled plates, side plates with which the spring-controlled plates have sliding engagement, links connecting the spring-controlled plates and the slides, a contact ring secured to the insulating plate and contacting with the side plates and electrical connections with the contact ring and the brushes.

16. A controller of the character described comprising a contact piece having radially extending tapering arms, a fixed insulating plate into which the contact piece is set, controlling mechanism comprising a shaft, a hub carried thereby and insulated therefrom, guide rods carried by the hub, relatively heavy centrifugally acting slides carried by the guide rods, brushes carried by the slides and engaging the contact piece and the insulating plate between the arms, side plates secured to the hub, relatively light sliding plates carried by the side plates, cross plates connecting the sliding plates, springs acting on the cross plates, links connecting the sliding plates and the slides, and electrical connections with the side plates and the brushes.

17. In combination a prime mover, a generator driven by the prime mover and a controller driven by the prime mover electrically connected with the generator and comprising an insulating plate, a contact piece having radial tapering arms set into the insulating plate, centrifugally acting brushes adapted to engage the contact piece and the insulating plate between the tapering arms, and electrical connections with the contact piece and the brushes, one of said connections leading to the generator.

18. A controller of the character described comprising an insulating plate, a contact piece having radial tapering arms set into the insulating plate, and centrifugally acting diametrically arranged brushes adapted to engage the tapering arms of the contact piece.

In testimony whereof I affix my signature in presence of two witnesses.

HUBERT MEREDITH-JONES.

Witnesses:
FRED ATWATER,
EDLA M. CULVER.

Copies of this patent may be obtained for five cents each, by addressing the "Commissioner of Patents, Washington, D. C."